United States Patent Office 2,981,710
Patented Apr. 25, 1961

2,981,710

WATER SOLUBLE HARDENABLE RESINOUS COMPOSITIONS

Herbert Hoenel, Graz, Austria, assignor to Vianova Kunstharz Aktiengesellschaft, Vienna, Austria, a corporation of Austria No Drawing. Filed Oct. 24, 1956, Ser. No. 617,922

Claims priority, application Austria Nov. 22, 1955

16 Claims. (Cl. 260—29.3)

The present process is a further development of the process described in Patent No. 2,681,894 according to which water dilutable or water soluble synthetic resins serving particularly as bases for stoving varnishes, are obtained by combining the following components: (I) a low molecular resol being water soluble or at least hydrophilic, (II) a resin having an acid number of at least about 40, which partly at least is obtained from components having higher, preferably unbranched aliphatic groups, and which therefore acts plasticizing, and which carries numerous hydrophilic groups the latter consisting predominantly at least of preferably primary hydroxyl groups corresponding to a hydroxyl equivalent number of about 150 and 250, and (III) ammonia or a water soluble strong organic nitrogen base.

According to this prior process the dilutability with water required for preparing varnishes depends upon that either at least the predominant part of the hardening component is water soluble per se or that an even rather considerable proportion of organic water miscible solvents is coemployed, such as for example the semi-ethyl ether of glycol (Cellosolve) which is a rather expensive substance. The greatest disadvantage of this process consists, however, in the poor stability especially of the initially water soluble resols (phenol alcohols), which gradually leads to the loss of water solubility not only of the resols themselves but also of the entire mixture. Since this gradually arising reduction of water solubility can considerably be accelerated by the basic component (which is essential for primarily producing water solubility of component II), especially ammonia, it has also been suggested to combine the three components only shortly before using the aqueous solution.

It has now been found that this disadvantage can be avoided, and moreover several other advantages on use be brought about when those ordinary resols (phenol alcohols) are replaced by resols carrying carboxylic groups. The water solubility or an at least very pronounced hydrophilic character of the resol, which often disturbs the flow and the wetting, can now be dispensed with, since in the present case generally the water solubility is brought about indirectly only by the formation of a soap with a basic component. The shelf life of the aqueous varnish produced from the new compositions can now be adjusted at least to the requirements generally occurring in the practice, which prolonged shelf life is of particular importance when the aqueous solution serves as a dipping varnish.

An implicit requirement, also for the present process, is, of course, the "compatibility" of the hardening component I with the plasticizing component II. This means the capability of the mixture of these two components to form a completely clear, resistant film upon stoving, while inadequate compatibility results in a turbid film which in extreme cases may be completely inhomogenous and incoherent. Individually the three components should have the following general features:

The hardening component (I) is a (poly-)methylol compound (resol) of a phenol carrying a carboxylic group, in other words, of a hydroxyaryl carboxylic acid. The acid number of this resol for which the term "carboxylic resol" will be used hereinafter, thus mainly depends upon the molecular size of said carboxylic acid from which it derives. It should preferably be above 100 and may be as high as about 250. In order to attain "compatibility" between the previously mentioned components, the average total number of reaction favourable positions, these being all (unoccupied) ortho- and para-positions to all phenolic hydroxyl groups present in the molecule of the hardening component (its functionality), must, as has been found, not essentially exceed two. It may be even to some degree less than two, the corresponding carboxylic resol nevertheless exhibiting an appropriate hardening capacity. Thus a comparatively large phenolic compound, such as e.g. a compound carrying one carboxylic group and comprising four nuclei (a compound of the so-called novolak type), should not predominantly derive from phenol but to a considerable extent from correspondingly substituted phenols since otherwise an undue increase of reaction favourable positions in the individual molecule occurs.

Generally it is, however, more desirable to form the carboxylic resol from smaller hydroxyaryl carboxylic acids, possibly even from a mononuclear compound. In any event the molecular stage of the resol should be as low as possible, and consequently, for its production mild conditions should be applied. Therefore, a subsequent introduction of a carboxylic group into the molecule of a preformed resol at relatively high temperatures is generally less desirable.

There are numerous representatives of well defined hydroxyaryl carboxylic acids which can be used for the present process. Since the lowest members of this class of substances, viz. salicylic acid and its p-isomer, cannot be directly used because of the absolute instability of their methylol compounds, the smallest usable definite representative to be considered is the p-oxyphenyl acetic acid. Easily accessible are the etherlike phenolic compounds of the glycolic acid, which also proved to be very suitable for the present process; they can be produced in a simple and easily controllable way by partially interacting polyvalent, more particularly divalent phenols with chloroacetic acid. These partial ethers still carrying free phenolic hydroxyl groups when interacted with formaldehyde at moderate temperatures with the aid of strong alkalis, form the corresponding phenol-polyalcohol, i.e. the "carboxylic resol," which is water soluble only after forming its soap with ammonia etc. Compounds produced in this way may display a surprisingly high efficiency even when or although only two reaction favourable positions are present in the molecule of the (partial) phenolic ether of the glycolic acid, whilst such reduced functionality generally, as is known, causes a comparatively low efficiency, and slowness in reactivity. This unforeseen behaviour thus makes possible considerable reduction of the proportion of the hardenable component (resol), particularly in comparison with the prior process mentioned above, which possibility assists in obtaining good wetting and flow of the varnish as well as evenness and gloss of the coating.

The plasticizing component (II) shows similar features to that of the prior process. It is a comparatively high molecular compound. Its acid number should be at least about 35–40; the most preferable range lies between about 50 and 70, but may also be considerably higher without interfering with the final aim. The free, preferably primary hydroxyl groups which together with the C=C linkages possibly being present cause the compatibility with component I, should be present in a number corresponding to about 45–85 parts by weight per each 1000 parts by weight of the substance, which means the presence of one gram-hydroxyl group in about 400 to 200 g. of the component. Exceeding this range indeed increases the good water solubility of the soap of component II as well as its compatibility with the hardening component; it may, however, impair the wetting and flow of the aqueous varnish as well as the water resistance of the stoved film. Going considerably below the above range, at least as far as plasticizing products having a high oil content are concerned, is inasmuch disadvantageous as the soap may become insufficiently water soluble or may form a viscous pasty watery solution lacking flowability, unless a considerable proportion of organic solvent is added. Generally it is advisable to keep the acid number and the hydroxyl content only as high as is necessary for attaining water solubility of the soap as well as compatibility with component I.

Also the presence of C=C linkages in the component II is suitable since they facilitate attaining compatibility with the other component. It is particularly increased by conjugated double bonds as well as by such C=C linkages which are in immediate neighbourhood to one or several C=O groups, as is the case when coemploying dehydrated castor oil, wood oil, isomerized linseed or soya bean oil or their fatty acids, acrylic, itaconic, maleic or fumaric acid etc. in the production of a polyester (alkyd) serving as component II.

In the latter cases, i.e. in the presence of C=C linkages, an additional increase of the compatibility is brought about by a treatment with peroxides as described in the copending application concerning a process for producing stoving varnishes, filed October 24, 1956, Serial No. 617,923, which particularly facilitates the achievement of good gloss of pigmented coatings. Moreover, such treatment increases the hardness of the film and may improve the water solubility of the soap.

Also in the present process strong water soluble inorganic or organic nitrogen bases serve as basic soap forming component III, such as ammonia, hydrazine, the low members of amines or amine alcohols, many of which are nowadays commercially available.

The basic component III may possibly interfere with the compatibility of the two main components. Probably due to the indifferent character, tertiary volatile amines are most suitable, trimethylamine being a commercially easily available representative, while ammonia and, although to a lesser degree, primary and secondary amines participate to a certain degree in the heat hardening process. A disturbed compatibility between the two other components arising by that way can be compensated by a reduction of the hardening capacity of the carboxylic resol. Tertiary volatile amines also mostly lead to the palest coatings, and their indifferent nature generally warrants the best shelf life of the aqueous mixture. The same applies for tertiary amine alcohols, such as triethanol amine or dimethyl monoethanol amine and the like. Amine alcohols in general as well as ammonia have proved to be advantageous due to the mostly unlimited water solubility of their resin soaps while ordinary amines more particularly tertiary ones, together with the carboxylic resol often form soaps which are water dilutable only to a limited extent. The non-volatile or only unreadily volatile amine alcohols additionally are more economically employed insofar as they are not lost on stoving but form a constituent of the final body. When employing them, however, a more rigorous mode of stoving is to be applied than with volatile bases in order to obtain an equally high water resistance of the coating.

In order to achieve complete water solubility generally an amount of 5 to 15% smaller than that calculated from the acid number of the two other components as being required for neutralization is sufficient. This fact also permits the employment of alkali sensitive pigments, such as Prussian blue.

The proportion between the components I and II may vary within wide limits as is shown by the examples; in general, however, the proportion of component II is suitably chosen as high as possible without impairing the hardness (mar-proofness) of the final coating.

The present process may, of course, be varied by coemploying those hardening compounds described in the prior process, which have no carboxylic groups, such as ordinary phenol alcohols or water soluble urea, melamine, etc. formaldehyde condensation products. The coemployment especially of phenol alcohols of blocked phenols often facilitates the achievement of the compatibility between the components.

Generally the execution of the present process does not require coemployment of an organic solvent miscible or to a considerable extent compatible with water especially when ammonia or amine alcohols are employed as base. The very high viscosity of the aqueous soap formed from component II when having a high oil content, frequently, however, makes it advisable to coemploy a water compatible solvent in order to reduce the viscosity. Most effective in this respect are the alcohols of only limited water compatibility, such as iso- or secondary butanol, but also propanols, as well as low ketones.

The stoving process may be promoted by adding an acid accelerator or its salt formed with the respective base.

As is the case with the products obtained by the known process, also those obtained according to the present process primarily may serve as bases for stoving varnishes; they may, however, also be employed as glues, impregnating agents and the like.

The partial products Ia to Ie described in the following are carboxylic resols, whilst partial products IIa to IId are plasticizing alkyds. Finally examples are given how aqueous stoving varnishes are prepared from a mixture of those partial products and a nitrogen base.

INTERMEDIATE PRODUCT Ia 1 mol o-cresol, technical grade, 80% (the balance consisting of phenol and homologues), 1 mol salicylic acid and 1 mol formaldehyde (30%) are heated to boiling under reflux and permanent stirring for six hours. After removal of the upper layer the temperature is raised to 180° C. The starting materials not entered into reaction are finally distilled off by diminished pressure, and any salicylic acid possibly still remaining is removed by exhaustingly washing and kneading the resin with warm water. After drying, 167 g. of a soft novolak with the acid number 158 are obtained. From the yield and the acid number it may be concluded that about 0.47 mol salicylic acid and 0.83 mol cresol have been bound by 1 mol formaldehyde and that therefore approximately a four-nuclear compound averagely is present.

Upon dissolving the novolak in the calculated quantity of aqueous soda lye, 90 g. formaldehyde (37%) are added, and the mixture is kept three days at a temperature of 35–40° C. Thereupon the calculated quantity of hydrochloric acid diluted with 100 g. butanol is added, and, after thoroughly shaking, the butanolic solution of the resinous resol is finally separated and washed several times with slightly warmed water. The yield is 310 g. with a solid content of almost 200 g., the latter having an acid number of about 130. Upon neutralization with ammonia or an amine alcohol the resin solution is fairly dilutable with water, while upon neutralization with e.g. trimethyl amine, a satisfactory dilutability with water is only achievable when solvents mediating water solubility, such as Ethyl Cellosolve, are added.

INTERMEDIATE PRODUCT Ib

From 3 mol technical tricresol DAB IV (containing about 35% m-cresol), and 1 mol acetaldehyde (or an equal proportion by weight of paraldehyde) a novolak is formed with the aid of hydrochloric acid as catalyst. The cresol not entered into reaction is distilled off by suitable means. From the yield of 195 g. can be concluded that predominantly a three-nuclear compound besides a subordinate proportion of a bi-nuclear compound is present.

150 g. of the novolak are dissolved in 250 cc. of hot 2 N solution of soda lye and alternatively there are added at 80° C. each one proportion of a solution of 50 g. chloroacetic acid in 50 g. water, and of a corresponding amount of a 2 N lye solution (totalling 265 cc.), whilst continuously stirring. Thereupon the temperature is kept at 90° C. for two hours. After cooling the aqueous upper layer is removed. A sample of the lower alkaline resin solution after appropriate removal of the alkali shows by the acid number of the dried substance that about 85–90% of the chloroacetic acid employed have entered into reaction with the novolak forming an acidic etherlike compound thereof.

The alkaline resin solution mixed with 120 g. formaldehyde (37%) is kept for one week at room temperature, and thereupon acidified with thinned sulfuric acid (methyl orange being used as an indicator). The resol precipitated as a very fine powder is rendered more granular by gently heating the mass, thereupon sucked off and washed with water several times. The yield of the wet resin is about 220 g. The carefully dried product has an acid number of about 130. After neutralizing with the calculated quantity of ammonia the resin is completely soluble in water and dilutable to a far going etxent.

INTERMEDIATE PRODUCT Ic 228 g. (1 mol) diphenylol propane (so-called "bisphenol") are dissolved in 500 cc. of a 2 N solution of soda lye under heating. Then the solution of 110 g. of the sodium salt of chloroacetic acid (technical grade) in 170 g. water is added, the temperature slowly raised from 40° C. up to 90° C. and kept for an hour while continuously stirring the reaction mixture.

After cooling and removing the thin aqueous upper layer the weight of the reaction mass is about 600 g. The part of a sample being freed from alkali by acidification, which is soluble in a mixture of toluene and butanol, shows by its acid number that about 85% of the bisphenol have entered into the etherification reaction.

The mass which still contains unaltered bisphenol is combined with 200 g. formaldehyde (35%) forming a clear solution and is kept for three days at about 40° C. Thereupon the mixture of resols is precipitated by the calculated quantity of hydrochloric acid in the presence of 100 g. butanol. After washing several times and thorough setting about 500 g. butanolic solution are obtained. The solid content amounts to about 340 g. and has an acid number of about 140. After neutralization with ammonia the solution is dilutable with water to an unlimited extent.

INTERMEDIATE PRODUCT Id

When employing chloroacetic acid and its salt, respectively, in excess of the theoretical amount suitably simultaneously eliminating any conditions which favourize its saponification, a practically quantitative etherification of the one phenolic hydroxyl group is achieved, in which case essentially the diphenylol propane glycolic acid semiether (its sodium salt respectively) is present. Thereupon condensation with 175 g. formaldehyde is carried out as described above and finally the mass is worked up, coemploying 114 g. butanol or cyclohexanol. The yield is about 520 g. solution or about 340 g. solids having an acid number of about 155.

The diphenylol propane employed for producing the two latter resols may be replaced by other analogous bisphenols which are obtained from higher ketones, such as methyl ethyl ketone, cyclohexanone, methyl cyclohexanone, etc. The bridge in the bisphenol may also be formed by S or $SO_2$ instead of an alkane rest, or dioxy diphenyl may serve as bisphenol, or also a mononuclear divalent phenol, in which case, however, the ether obtained from resorcinol possesses too high a reactivity.

INTERMEDIATE PRODUCT Ie

The reactivity of a bisphenol or the etherlike derivative, respectively may also be reduced systematically by partly replacing the phenol by a homologue, more particularly o-cresol, when producing said bisphenol. The procedure is for instance as follows: 10 g. gaseous hydrochloric acid are introduced during several hours into a mixture of 140 g. phenol, 60 g. o-cresol and 100 g. cyclohexanone at 50° C. The reaction mass is kept for three days at 50–60° C., and thereupon washed several times with boiling water until complete removal of the hydrochloric acid. The still wet crystalline mass has a dry weight of about 250 g. which corresponds to about 89% of the theoretical yield or to a quantity of about 0.9 mol bisphenol mixture.

With the aid of soda lye and chloroacetic sodium salt the mass is caused to form the ether of glycolic acid in an analogous way as described with products Ic and d, and is condensed with 150 g. formaldehyde (37%) as above, and finally worked up in the presence of 100 g. butanol. The yield is about 440 g., with a solid content of about 350 g. having an acid number of about 140.

Since the bisphenol obtained above partly consists of a trifunctional phenol only, the larger part being tetrafunctional, the etherlike derivative to some etxent is a monofunctional phenolic compound only, the average functionality thus being slightly below two.

INTERMEDIATE PRODUCT IIa

Each 70 g. phthalic anhydride, dehydrated castor oil fatty acid and tall oil fatty acids (both distilled, acid number about 190), and 100 g. pentaerythritol, technical grade, the content of polypentaerythritol being about 15% as a maximum, are heated to 180–230° C. while thoroughly stirring until the acid number of the mixture has dropped to about 35. After cooling to 180 C. further 30 g. phthalic anhydride are added and this temperature kept for about 15 minutes. After cooling to 160° C., 15 g. hydrogen peroxide (30%) are slowly added under stirring. The resin (yield 325 g., acid number 61) is dissolved in 65 g. of sec. butanol.

The composition of the alkyd resin described hereinbefore may be varied. If the 30 g. subsequently added phthalic anhydride are replaced by an equivalent proportion of f.i. adipic acid (about 30 g.) the alkyd obtained has a more pronounced plasticizing character.

INTERMEDIATE PRODUCT IIb

The second portion of 30 g. phthalic anhydride employed for producing the above described alkyd is replaced by an equivalent amount of maleic anhydride, maleic, fumaric or itaconic acid. Esterification is carefully carried out until the same final acid number is reached. The alkyd obtained shows an improved compatibility with the hardening component.

INTERMEDIATE PRODUCT IIc 213 g. (1 mol) distilled coconut oil fatty acids (fraction C 10/C 12, acid number 263), and 140 g. pentaerythritol (about 1 mol), chemically pure, melting point 240° C., are heated together up to 180–250° C. whereby the monoester is formed. Thereupon 116 g. fumaric acid are added and a polyester with an acid number of 63 is formed by heating up to 180–220° C. under exclusion of air. Yield about 420 g.

INTERMEDIATE PRODUCT IId

A monoester mixture is formed from 125 g. linseed oil and 40 g. pentaerythritol, technically pure, melting point 240° C., whereupon further 10 g. pentaerythritol, 10 g. trimethylol ethane and 40 g. isophthalic acid, technical grade (contaminated with about 10-15% terephthalic acid) are added. The mixture is heated up to a temperature above 220° C. while continuously stirring until the acid number has dropped to 15. Thereupon 40 g. maleic anhydride are added and the temperature kept at 180° C. until an acid number of 85 is reached.

Example 1

60 g. partial product IIa (50 g. solids) are mixed with 75 g. resol solution Ia, 100 g. water and 20 g. ammonia (20%). An aqueous varnish of about 40% is obtained, when stoved e.g. at 170-180° C., coatings of great hardness, elasticity and resistance are obtained.

Example 2

60 g. partial product IIa, 30 g. wet resinous resol Ib, 15 g. sec. butanol, 100 g. water and 12 g. of a 50% aqueous solution of trimethylamine form a varnish with 35% solid content which may be further thinned with water to any desired extent and which is suited for spraying and dipping. A coating stoved for 15 minutes at 180° C. gives extremely elastic films of extraordinary hardness and adhesion.

Example 3

60 g. partial product IIc are mixed with 33 g. of the butanolic resol solution Ic (derived from 15 g. "bisphenol") and about 24 g. liquid resol (consisting essentially of the dialcohol) obtained in a known manner from 15 g. p-tert. butyl phenol and 20 g. formaldehyde (30%), and the mixture is neutralized with trimethylamine solution. The mixture may be thinned with water to any desired extent. After stoving an application at about 170° C. a light, very hard, highly elastic and adhesive coating is obtained.

If the proportion between the two resols is altered in favour of the first mentioned one, the stoved coating shows turbidity which increases with the predomination of the said resol. If, however, the polyester had been treated with hydrogen peroxide (30%), using e.g. 10% of the ester weight, in the manner indicated in the copending application concerning a process for producing stoving varnishes, filed October 24, 1956, Serial No. 617,923, the proportion of the second resol may be reduced to about the half or even less without impairing the clearness of the stoved film, i.e. the "compatibility."

Example 4

A mixture of 120 g. partial product IIa (100 g. solids) and 57 g. resol solution Id (derived from 25 g. "bisphenol" and 7 g. formaldehyde (100%), about 37 g. solids) is neutralized by introducing gaseous trimethylamine, 12½ g. being required therefor. The mass has a solid content of about 72% and is water soluble to an unlimited extent.

An application of an e.g. 40% solution already after stoving for 10-15 minutes at 160° C. gives a film of extraordinary hardness and elasticity. In case the stoved film is not completely clear, clearness is attained on any account by adding a small amount e.g. of the resol derived from butyl phenol coemployed according to Example 3, or of the melamine resin solution described in Example 4a of the copending application concerning a process for producing stoving varnishes, filed October 24, 1956, Serial No. 617,923, at the same time suitably increasing the plasticizing component correspondingly.

The relative proportion of the carboxylic resol being employed in this example, which is sufficient for attaining a perfectly mar-proof coating, is surprisingly low in comparison to the proportion of resol which in the prior process was necessary for the same effect. According to the prior process, e.g. 100 g. of the alkyd resin employed in the present example would need a resol derived from at least each 20 g. phenol, o-cresol and formaldehyde (calculated as 100%), while the resol employed in the present example derives from only 25 g. "bisphenol" and 7 g. formaldehyde (100%). The considerable reduction to about one third of the hydroxyl groups impairing the flow is very favourable for the properties of the varnish.

Example 5

If the trimethylamine employed in Example 4 is replaced by ammonia, it is necessary for obtaining compatibility to substitute a considerable part of the carboxylic resol by the resol derived from butyl phenol mentioned above up to a proportion of about 2:1. Moreover, in order to achieve the same hardness the total amount of the resols should be increased, corresponding to about 20 g. "bisphenol" and 10 g. butyl phenol. The stoved coating turns much more yellow than that by employing trimethylamine.

Example 6

In Example 4 the partial product IIa is replaced by the more reactive partial product IIb; the alkyd is completely compatible with the carboxylic resol Id also without being treated with peroxide. The resol may even be further reduced to about 43 g. of its butanolic solution (derived from 20 g. "bisphenol") without impairing the marproofness of the stoved film (160° C., 15 minutes). Such an ester treated with hydrogen peroxide (30%), suitably 3 to 4 parts per 100 parts, gives especially glossy pigmented stoving varnishes.

Example 7

120 g. partial product IIb (100 g. solids) are mixed with 69 g. carboxylic resol solution according to Id (derived from 30 g. "bisphenol") and 32 g. triethanolamine. The mass has a solid content of 80% and is water soluble to an unlimited extent. Coatings stoved at 180° C. for 20-30 minutes possess a high water resistance.

Example 8

100 g. partial product IId are mixed at moderate heat with 100 g. resol solution Ie and a partial phosphoric ester derived from 0.7 g. phosphor pentoxide and 2.2 g. butyl phenol; the mixture is neutralized with trimethylamine. After thinning with water up to a total weight of 450 g. an about 40% varnish is obtained. After stoving at 170° C. a mar-proof, highly elastic coating is obtained.

The term "resol" as used in the following claims designates a low molecular soluble phenol methylol compound obtained by interacting formaldehyde with the aid of an alkaline catalyst with mononuclear or polynuclear phenols characterized in that under influence of heat the resol is changed into an at least substantially higher molecular compound which, however, not necessarily, passes into the insoluble stage when being heated alone. The resol may carry at least one or a plurality of methylol groups directly attached to the phenolic nuclei present in the molecule.

What I claim is:

1. A substantially neutral composition of matter being water dilutable, which comprises the following components: (I) a low molecular weight resol of formaldehyde and a phenol in which the total number of positions on the benzene ring which are reactable with formaldehyde, selected from a group consisting of ortho- and para- in relation to the phenolic hydroxy groups is essentially two, said resol having at least one carboxylic group chemically bonded to the resol and an acid number ranging between 100 and 250; (II) a plasticizing alkyd resin which has an acid number of at least 35 and which due to its being obtained from an excess of hydroxy compounds has a free hydroxyl value of from 200–400 and; (III) a water soluble base selected from the group consisting of ammonia and strongly basic amines.

2. A composition of matter according to claim 1 in which said resol is derived from formaldehyde and a phenol consisting of a partial ether of a polyhydric phenol and glycolic acid.

3. A process for the production of stoving varnishes from a substantially neutral mixture which comprises admixing (I) a low molecular weight resol of formaldehyde and a phenol in which the total number of positions on the benzene ring which are reactable with formaldehyde, selected from the group consisting of ortho- and para- in relation to the phenolic hydroxy groups is essentially two, said resol having at least one carboxylic group chemically bonded to the resol and an acid number ranging between 100 and 250; (II) a plasticizing alkyd resin which has an acid number of at least 35 and which due to its being obtained from an excess of hydroxy compounds has a free hydroxyl value of from 250–400 and; (III) a water soluble base selected from the group consisting of ammonia and strongly basic amines and diluting the mixture with water to form a varnish.

4. The process of claim 3 wherein the mixture of I, II, and III is diluted with a major portion of water and a minor portion of an organic solvent compatible with water at least in limited portions.

5. A process according to claim 4 in which said resol is a methylol compound of a hydroxyaryl carboxylic acid, the carboxylic group is attached to the nucleus of the aryl constituent by an ether linkage of the formula

wherein R is a divalent aliphatic radical.

6. A process according to claim 4 in which said resol is the reaction product of formaldehyde and a phenol consisting of a partial ether of a polyhydric phenol and glycolic acid.

7. A process according to claim 4 in which the resol is obtained by the following steps: (a) interacting a diphenylol alkane with an alkali salt of chloroacetic acid with the aid of a substantially equal molecular proportion of caustic alkali solution per mole of diphenylol alkane, whereby the semi ether of the divalent phenol and the salt of the glycolic acid is formed, (b) interacting said ether salt at moderate temperatures with at least two mols of formaldehyde, a dimethylol compound of said ether salt being formed thereby, (c) acidifying the reaction mixture in the presence of a solvent to eliminate any alkali, and (d) separating the resinous solution thereby obtained, and washing it to eliminate the salts formed.

8. A process according to claim 4, in which the component II is subjected to an oxidizing treatment with an oxidizing agent which is a member of the group consisting of hydrogen peroxide and organic peroxides before combination with the remaining components.

9. A process according to claim 4, in which the component II is subjected to an oxidizing treatment by means of hydrogen peroxide at elevated temperature before combination with the remaining components.

10. The composition of claim 1 wherein I is a hardening methylol compound of formaldehyde and a phenol having at least one carboxylic group chemically bonded thereto, which phenol is a member of the group consisting of (a) mononuclear monohydric phenols substituted in one position selected from the group consisting of ortho- and para- in relation to the phenolic hydroxyl by the group —R—COOH, (b) mononuclear monohydric phenols substituted in one position selected from the group consisting of ortho- and para- in relation to the phenolic hydroxyl by the group —O—R—COOH, (c) polynuclear polyhydric phenols having two to four aromatic nuclei, in which at least one of the phenolic OH groups is replaced by the group —O—R—COOH, R in (a), (b) and (c) indicating a divalent aliphatic radical, (d) polynuclear polyhydric phenols having two to four aromatic nuclei, in which at least one hydrogen atom of the nuclei is replaced by a carboxylic group; said phenols having a total number of positions selected from the group consisting of ortho- and para- in relation to the phenolic hydroxyl which is essentially two; said compound being obtained by interacting the formaldehyde and phenol at moderate temperatures with the aid of caustic alkali.

11. An essentially neutral stoving varnish comprising the following components: (I) a butanol solution of a carboxylic resol, said resol substantially consisting of the dimethylol compound of the semi ether of 25 parts of diphenylol propane and glycolic acid having the ether oxygen attached to a phenolic nucleus of the diphenylol propane and 12½ parts of butanol; (II) a solution consisting of 20 parts of secondary butanol and 100 parts of an alkyd resin, the alkyd being obtained from 100 g. phthalic anhydride, 70 g. dehydrated castor oil fatty acids, 70 g. tall oil fatty acids, and 100 g. pentaerythritol, having an acid number of about 61, and being oxidized with 15 g. hydrogen peroxide (30%); (III) about 12½ parts trimethylamine which forms substantially neutral soaps by introducing it in its gaseous form into the mixture of I and II; and (IV) about 150 parts water, said mixture forming about 340 parts of a solution having a solid content of about 40%, which is further dilutable with water.

12. An essentially neutral stoving varnish comprising the following components: (I) a butanol solution of a carboxylic resol, said resol substantially consisting of the dimethylol compound of the semi ether of 20 parts of diphenylol propane and glycolic acid having the ether oxygen attached to a phenolic nucleus of the diphenylol propane, and 10 parts of butanol; (II) a solution consisting of 20 parts of secondary butanol and 100 parts of an alkyd resin, the alkyd being obtained from 70 g. phthalic anhydride, 70 g. dehydrated castor oil fatty acids, 70 g. tall oil fatty acids, 100 g. pentaerythritol, and 20 g. maleic anhydride, having an acid number of about 61, and being oxidized with 3–4 parts hydrogen peroxide (30%) per each 100 parts of the resin; (III) about 12½ parts trimethylamine forming substantially neutral soaps by introducing it in its gaseous form into the mixture of I and II; and (IV) about 150 parts water, said mixture forming about 340 parts of a solution having a solid content of about 40%, which is further dilutable with water.

13. A process according to claim 4 wherein the plasticizing alkyd resin (component II) contains ethylenic unsaturation in the acid moiety.

14. A process according to claim 4 wherein the plasticizing alkyd resin (component II) contains conjugated ethylenic unsaturation in the acid moiety.

15. A process according to claim 4 wherein the plasticizing alkyd resin (component II) contains ethylenic unsaturation conjugated with a carbonyl group in the acid moiety.

16. A composition of matter according to claim 1 in which said phenol is a diphenylol alkane mono-ether of glycolic acid.

References Cited in the file of this patent

UNITED STATES PATENTS

| | | |
|---|---|---|
| 2,013,496 | Kranzlein et al. | Sept. 3, 1935 |
| 2,681,894 | Honel | June 22, 1954 |